(12) United States Patent
Krulitsch et al.

(10) Patent No.: US 10,060,456 B2
(45) Date of Patent: Aug. 28, 2018

(54) FORMAT PART AND FORMAT PART FASTENER

(71) Applicant: KHS GmbH, Dortmund (DE)

(72) Inventors: Dieter-Rudolf Krulitsch, Bad Kreuznach (DE); Michael Jox, Bingen (DE)

(73) Assignee: KHS GmbH, Dortmund (DE)

( * ) Notice: Subject to any disclaimer, the term of this patent is extended or adjusted under 35 U.S.C. 154(b) by 350 days.

(21) Appl. No.: 15/021,018

(22) PCT Filed: Aug. 20, 2014

(86) PCT No.: PCT/EP2014/067710
§ 371 (c)(1),
(2) Date: Mar. 10, 2016

(87) PCT Pub. No.: WO2015/036209
PCT Pub. Date: Mar. 19, 2015

(65) Prior Publication Data
US 2016/0222998 A1    Aug. 4, 2016

(30) Foreign Application Priority Data

Sep. 12, 2013   (DE) .................. 10 2013 110 048

(51) Int. Cl.
*F16B 2/24*     (2006.01)
*B65G 21/20*    (2006.01)
(Continued)

(52) U.S. Cl.
CPC .............. *F16B 2/248* (2013.01); *B65B 59/00* (2013.01); *B65B 59/04* (2013.01); *B65G 21/2072* (2013.01)

(58) Field of Classification Search
CPC ............ B65G 21/2045; B65G 21/2063; B65G 21/2072; B65G 21/209; Y10T 403/7075;
(Continued)

(56) References Cited

U.S. PATENT DOCUMENTS 2,987,313 A * 6/1961 Bjering ................. B67B 3/2033
269/14
4,923,571 A * 5/1990 Kronseder ......... B65G 21/2072
198/454
(Continued)

FOREIGN PATENT DOCUMENTS

DE          30 33 955         4/1982
DE          37 02 252         8/1988
(Continued)

*Primary Examiner* — Jonathan P Masinick
(74) *Attorney, Agent, or Firm* — Occhiuti & Rohlicek LLP

(57) ABSTRACT

A format-part fastener for attaching an interchangeable format part to a machine frame includes a first connecting element having a mounting stud that extends along the stud's axis and that has an angled face that defines an acute angle relative to the stud's axis. A second connecting element has a locating sleeve for receiving the mounting stud. The locating sleeve has walls forming a slot. When used to attach a format part, a spring cotter's undulating section surrounds part of the locating sleeve's circumference while the slot supports the spring cotter's shank against the mounting stud's angled face. This converts some of the spring cotter's radial force into an axially directed force along the stud's axis.

18 Claims, 5 Drawing Sheets

(51) Int. Cl.
*B65B 59/00* (2006.01)
*B65B 59/04* (2006.01)

(58) Field of Classification Search
CPC ......... Y10T 403/7079; Y10T 403/7088; F16B 7/042
See application file for complete search history.

(56) References Cited

U.S. PATENT DOCUMENTS

| | | | | |
|---|---|---|---|---|
| 5,732,528 A * | 3/1998 | Peronek | ................ | B65B 43/60 |
| | | | | 53/201 |
| 5,784,857 A * | 7/1998 | Ford | ................ | B65B 35/26 |
| | | | | 198/473.1 |
| 7,273,144 B2 * | 9/2007 | Guernieri | ............... | B65G 29/00 |
| | | | | 198/459.2 |
| 7,584,839 B2 * | 9/2009 | Bugge | ................ | B65G 15/62 |
| | | | | 198/814 |
| 7,748,522 B2 * | 7/2010 | Reiner | ................ | B65G 21/10 |
| | | | | 198/836.1 |
| 8,312,985 B2 * | 11/2012 | Suther | ................ | B65G 29/00 |
| | | | | 198/473.1 |
| 2016/0318713 A1 * | 11/2016 | Fahldieck | .............. | B65G 21/06 |

FOREIGN PATENT DOCUMENTS

| | | |
|---|---|---|
| DE | 40 04 497 | 8/1991 |
| DE | 697 01 171 | 6/2000 |
| DE | 10 2006 023317 | 11/2007 |
| DE | 10 2009 018731 | 10/2010 |
| EP | 2 583 916 | 4/2013 |
| GB | 1 516 309 | 7/1978 |

* cited by examiner

FORMAT PART AND FORMAT PART FASTENER

RELATED APPLICATIONS

This is the national stage, under 35 USC 371, of PCT application PCT/EP2014/067710, filed on Aug. 20, 2014, which claims the benefit of the Sep. 12, 2013 priority date of German application DE 10 2013 110 048.1, the contents of which are herein incorporated by reference.

FIELD OF INVENTION

The invention relates to container-processing machines, and in particular, to reconfiguring such machines for different types of container.

BACKGROUND

Containers, such as bottles, come in many sizes and shapes. As a practical matter, any machine that handles these containers would have to be configured to accommodate these sizes and shapes.

Most container-processing machines and transport lines have "format parts" that act as interfaces customized to the specific container. To reconfigure a machine for a different container, one simply exchanges the format parts, while leaving the rest of the machine alone.

Although the use of interchangeable format parts simplifies matters a great deal, any container-processing machine will have a great many of these format parts. The sheer number of such format parts to be exchanged makes reconfiguration a daunting task with significant machine downtime.

SUMMARY

An object of the invention is to provide a way to rapidly exchange format parts while ensuring that the format parts are precisely positioned.

In one aspect, the invention features a format-part fastener to be used for attaching an interchangeable format part to a machine frame. The format-part fastener includes a first connecting element having a mounting stud that extends along a stud axis and that has an angled face that defines an acute angle relative to the stud's axis. A second connecting element has a locating sleeve for receiving the mounting stud. The locating sleeve has walls forming a slot. When used to attach a format part, a spring cotter's undulating section surrounds part of the locating sleeve's circumference while the slot supports the spring cotter's shank against the mounting stud's angled face. The machine frame is typically a frame of either a container treatment machine or a container transport device.

In some embodiments, the angled face presents a profile such that a spring force exerted by the shank section radially inward toward the centerline causes the stud to exert an axially directed force that causes contact faces of the first and second connecting elements to lie against one another.

Among the embodiments are those in which the angled face defines an angle that opens towards a free end of the mounting stud.

In yet other embodiments, the angled face is a part of a wall that forms a circumferential groove in the stud.

Also among the embodiments are those in which the first connecting element comprises an annular face that surrounds the mounting stud, the locating sleeve comprises an annular face, the annular face of the first connecting element forms a first contact face, and the annular face of the locating sleeve forms a second contact face.

Embodiments include those in which at least one of the two connecting elements comprises a connecting plate. This connecting plate can be attached to either the format part or to the machine frame.

Embodiments also include those in which the first connecting element is provided on the format part and wherein the second connecting element is provided on the machine frame, as well as those in which the second connecting element is provided on the format part and the first connecting element is provided on the machine frame.

Other embodiments include the interchangeable format part.

As used herein, "format parts" include guides and guide elements for containers, in particular for use with container treatment machines or container transporters.

As used herein, expressions such as "essentially," "in essence," or "around" mean variations from the respective exact value by ±10%, preferably by ±5%, and/or variations in the form of changes insignificant for the function.

Further embodiments, advantages, and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

These and other features of the invention will be apparent from the following detailed description and the accompanying figures, in which.

DETAILED DESCRIPTION

Figure 1:
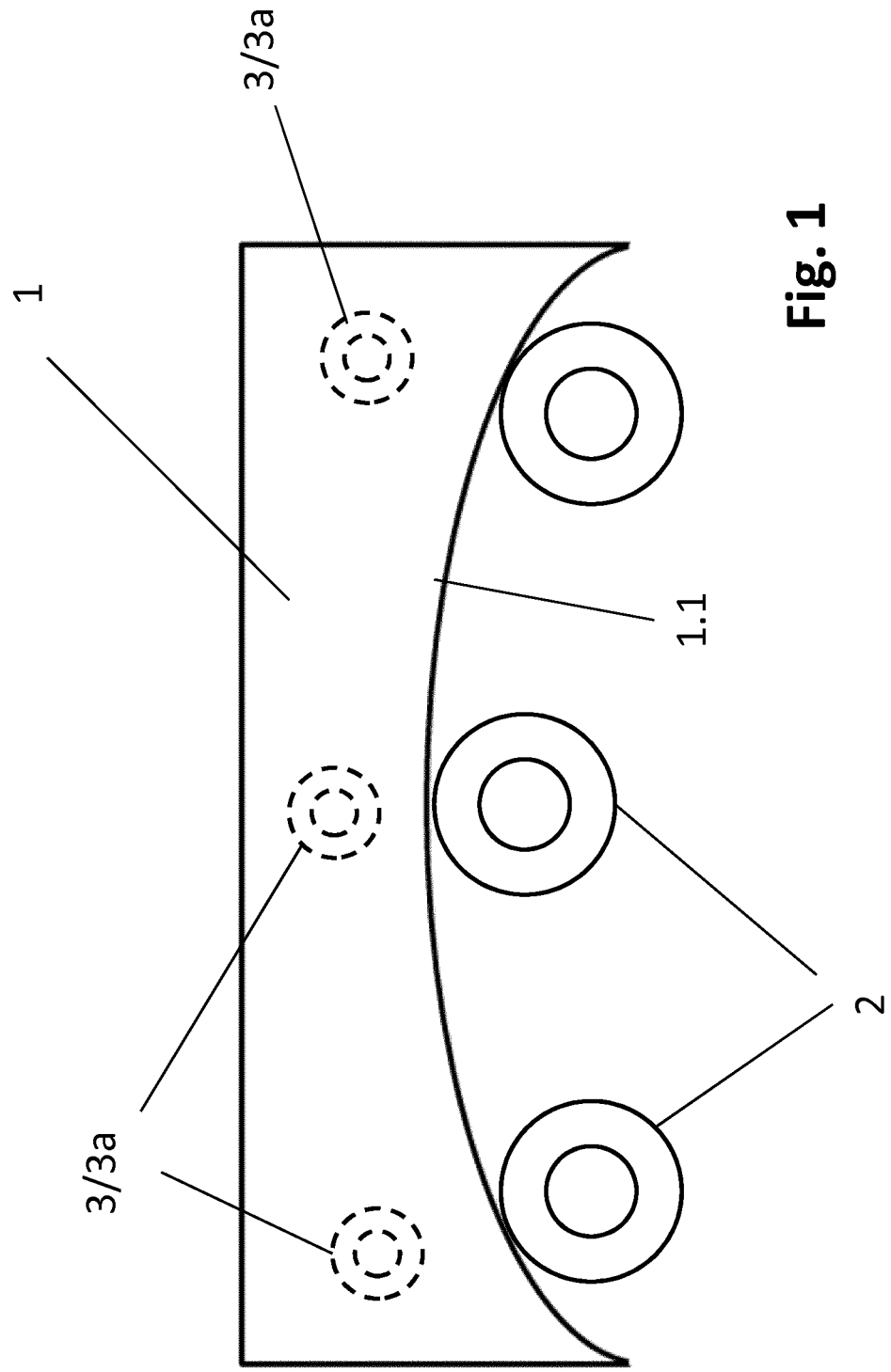
FIG. 1 shows a format part configured as a container guide.

FIG. 1 shows a format part 1 that forms an arch-shaped guide 1.1 for guiding containers 2. Such a guide 1.1 can be used, for example, on a container transport line or in either a container inlet or a container outlet of a container-treatment machine. Examples of such container-treatment machines include filling machines, sealing machines, and labeling machines.

Figure 2:
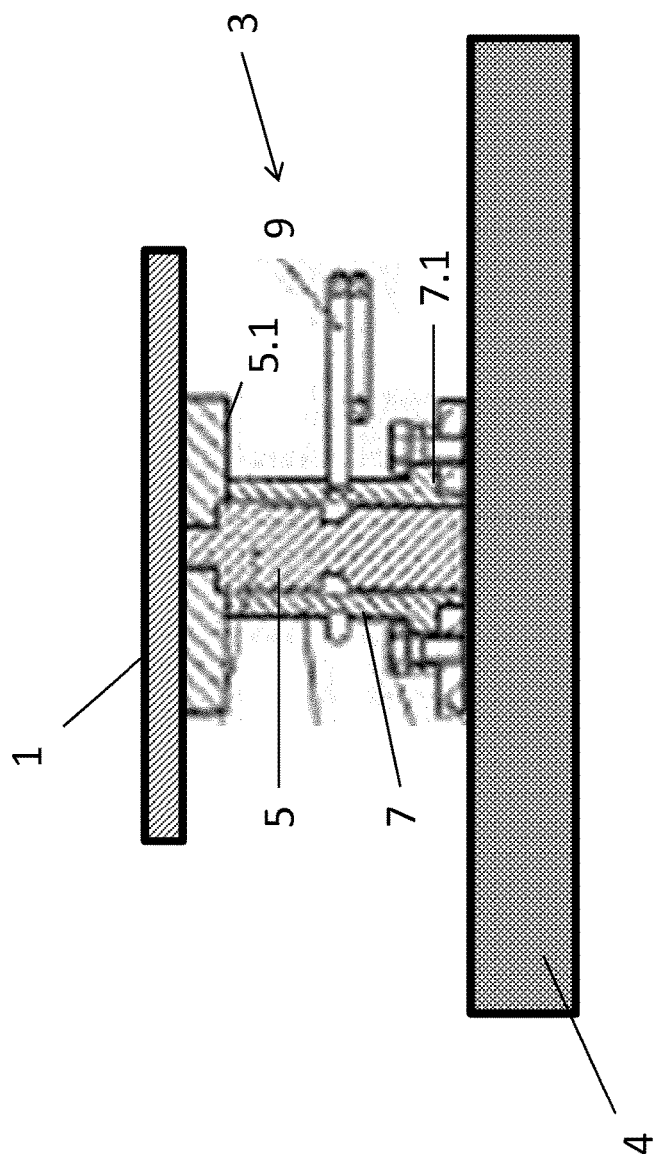
FIG. 2 shows a section through a quick-action format part fastener, together with the format part and a machine table.

It is often necessary to reconfigure such machines to accommodate different kinds of containers. To facilitate ease of exchange, a plurality of quick-action format part fasteners 3 attach the format part 1 to a part of a machine frame 4 of a container-treatment machine as shown in FIG. 2. A typical part is a table, such as an intake table. The use of quick-action format part fasteners 3 makes it possible to easily and quickly change all the format parts 1 as needed.

To promote ease of exchangeability, it is sometimes not enough for a format part 1 to be held on machine frame 4 reliably and securely with quick-action format part fasteners 3. It must also be guaranteed that after it has been attached, the format part 1 automatically assumes a predetermined orientation and position relative to other function elements. In particular, it must also be ensured that format part 1 is at a predetermined distance from the machine frame 4 or from its local attachment level.

Figure 3:
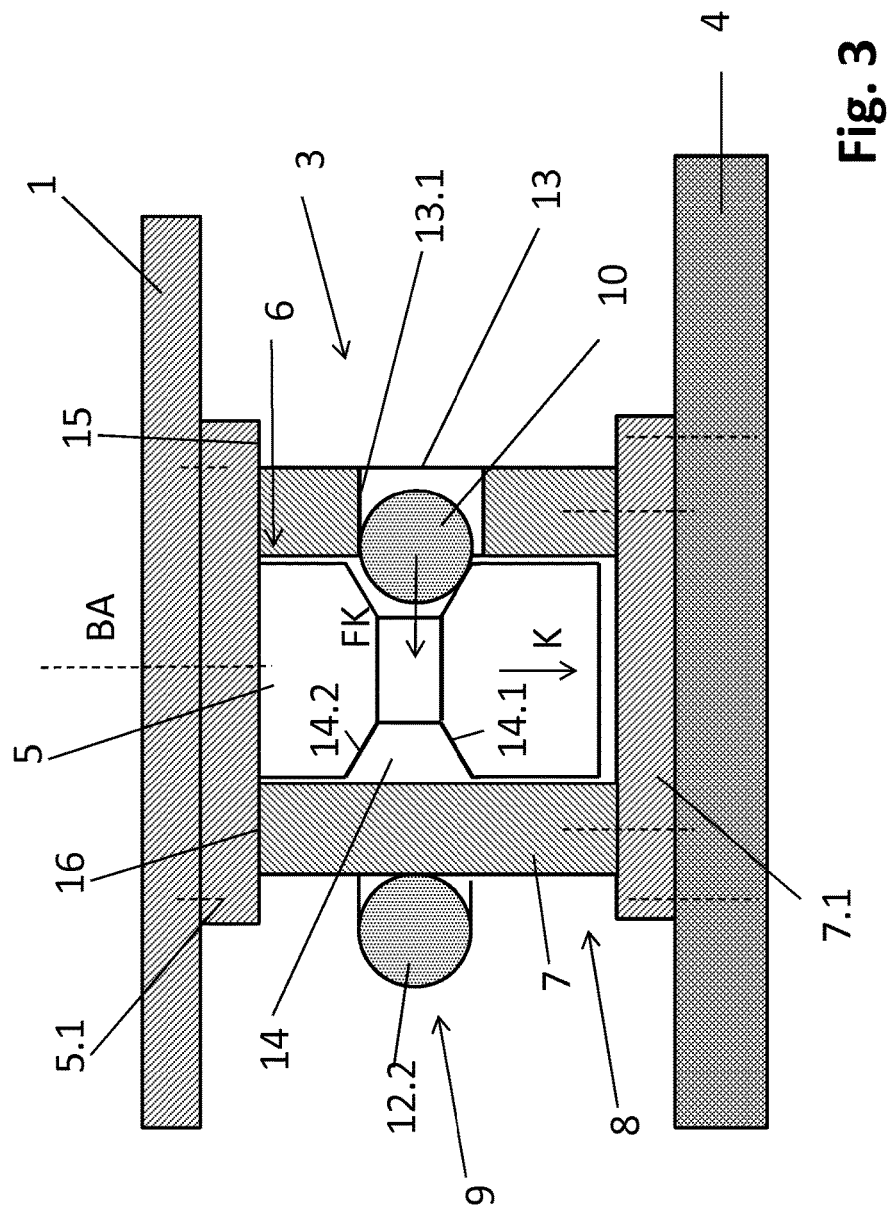
FIG. 3 shows the quick-action format part fastener of FIG. 2 in more detail.

Referring to FIGS. 2-3, a quick-action format part fastener 3 includes a mounting stud 5. A first connecting plate 5.1 attaches the mounting stud 5 to the format part 1. The mounting stud 5 and the first connecting plate 5.1 together define a first connecting element 6.

The quick-action format part fastener 3 also includes a locating sleeve 7 for the mounting stud 5. A second connecting plate 7.1 attaches the locating sleeve 7 to the machine frame 4. The locating sleeve 7 and the second connecting plate 7.1 define a second connecting element 8.

In a typical embodiment, the mounting stud 5, the first connecting plate 5.1, the locating sleeve 7, and the connecting plate 7.1 are made of a metal, such as stainless steel.

Figure 4:
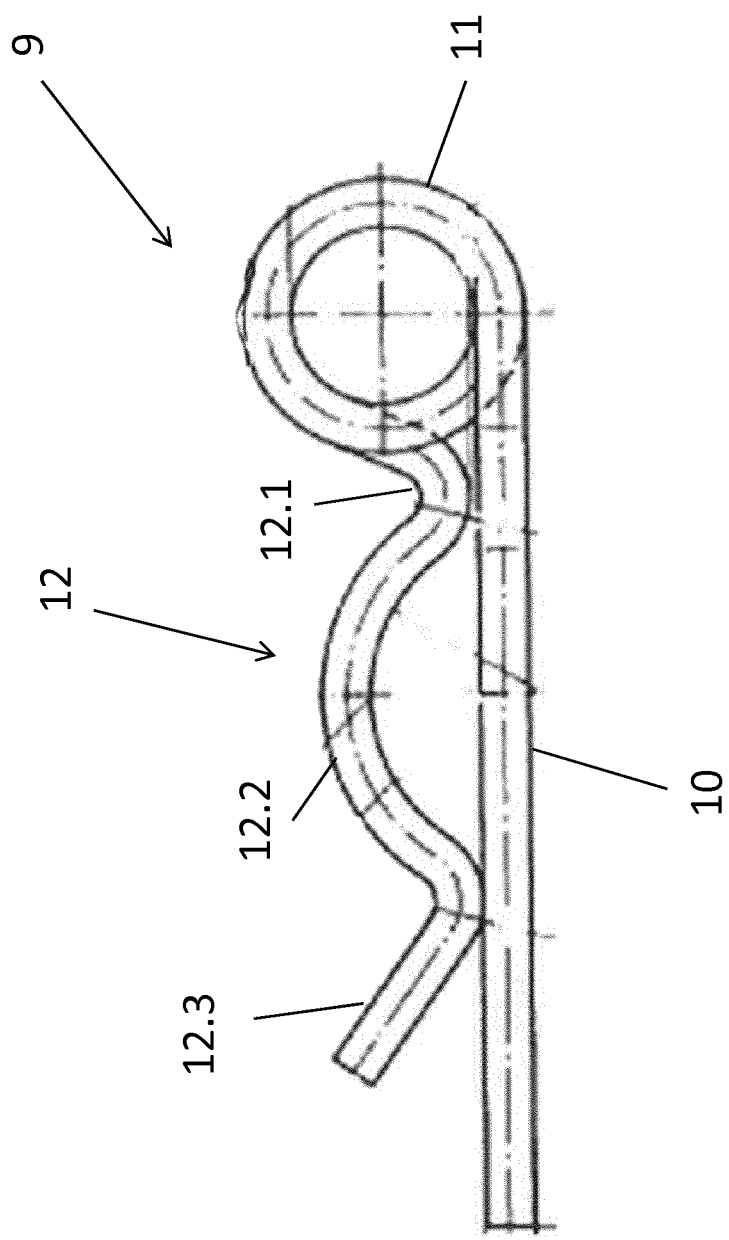
FIG. 4 shows a spring cotter of the quick-action format part fastener of FIGS. 2 and 3.

Referring to FIG. 4, the quick-action format part fastener 3 further includes a spring cotter 9. The spring cotter 9 has three contiguous sections: a straight shank section 10, an undulating section 12, and a coil section 11 between them. When the spring cotter 9 is relaxed, the undulating section 12 lies opposite the shank section 10.

The undulating section 12 includes a proximal segment 12.1 that is closest to the coil section 11, a middle segment 12.2 that is concavely arched on the side facing the shank section 10, and a distal segment 12.3 that leads to the tip of the undulating section 12. With the spring cotter 9 relaxed, the distal segment 12.3 runs in a straight line that defines a distally-facing acute angle between itself and the shank section 10.

The spring cotter 9 secures the mounting stud 5 when the mounting stud 5 is introduced into the locating sleeve 7. It also ensures the necessary distance between the first and second connecting plates 5.1, 7.1 and hence, the necessary distance between the format part 1 and the fastening level on the machine frame 4.

The locating sleeve 7 has a continuous slot 13 having a slot side face 13.1. The slot 13 is oriented so that it extends along a plane square to the stud's centerline BA and over part of the circumference of the locating sleeve 7.

Meanwhile, a circumferential groove 14 in the mounting stud 5 extends between its angled lower side face 14.1, which is the side face closest to the mounting stud's free end, and its angled upper side face 14.2.

The groove's upper and lower side faces 14.1, 14.2 are disposed along the mounting stud 5 in such a way that correctly positioning the format part 1 on the machine frame 4 will align the slot 13 and the circumferential groove 14, as shown in FIG. 3. This assures the necessary distance between the format part 1 and the fastening level on the machine frame 4.

To lock the quick-action format part fastener 3, the spring cotter 9 is pushed from the side onto the locating sleeve 7 in such a way that the slot 13 accommodates a first portion of its shank section 10. The remaining portion of its shank section 10 projects out of the slot 13 and into the locating sleeve 7 where it contacts one of the angled side faces 14.1, 14.2, which in the depiction shown in FIG. 3 is the lower side face 14.1. Meanwhile, the middle segment 12.2 of the undulating section 12 encloses part of the length of locating sleeve 7 on the side opposite the slot 13. Both the shank section 10 and the undulating section 12 lie in a plane square to the mounting stud's centerline BA. Because the shank section 10 lies not only against the groove's lower side face 14.1 but also against the slot's side face 13.1, which is at a distance from the groove's side face 14.1, and which, in the depiction of FIG. 3, is the groove's upper side face, and because the spring cotter's coil section 11 pre-tensions the shank section 10 radially inwards with a spring force FK acting towards the stud's centerline BA, there is a resulting force K that acts on the mounting stud 5 in the direction of its centerline BA. This resulting force K causes a contact face of the first connecting element 6 comes to rest against a defined contact face of the second connecting element 8, specifically in the depicted embodiment being the side of the first connecting plate 5.1 which faces locating sleeve 7 against the upper edge of locating sleeve 7. This connection, once made, not only secures the format part 1 to the machine frame 4 but also ensures it remains at the correct position.

Figure 5:
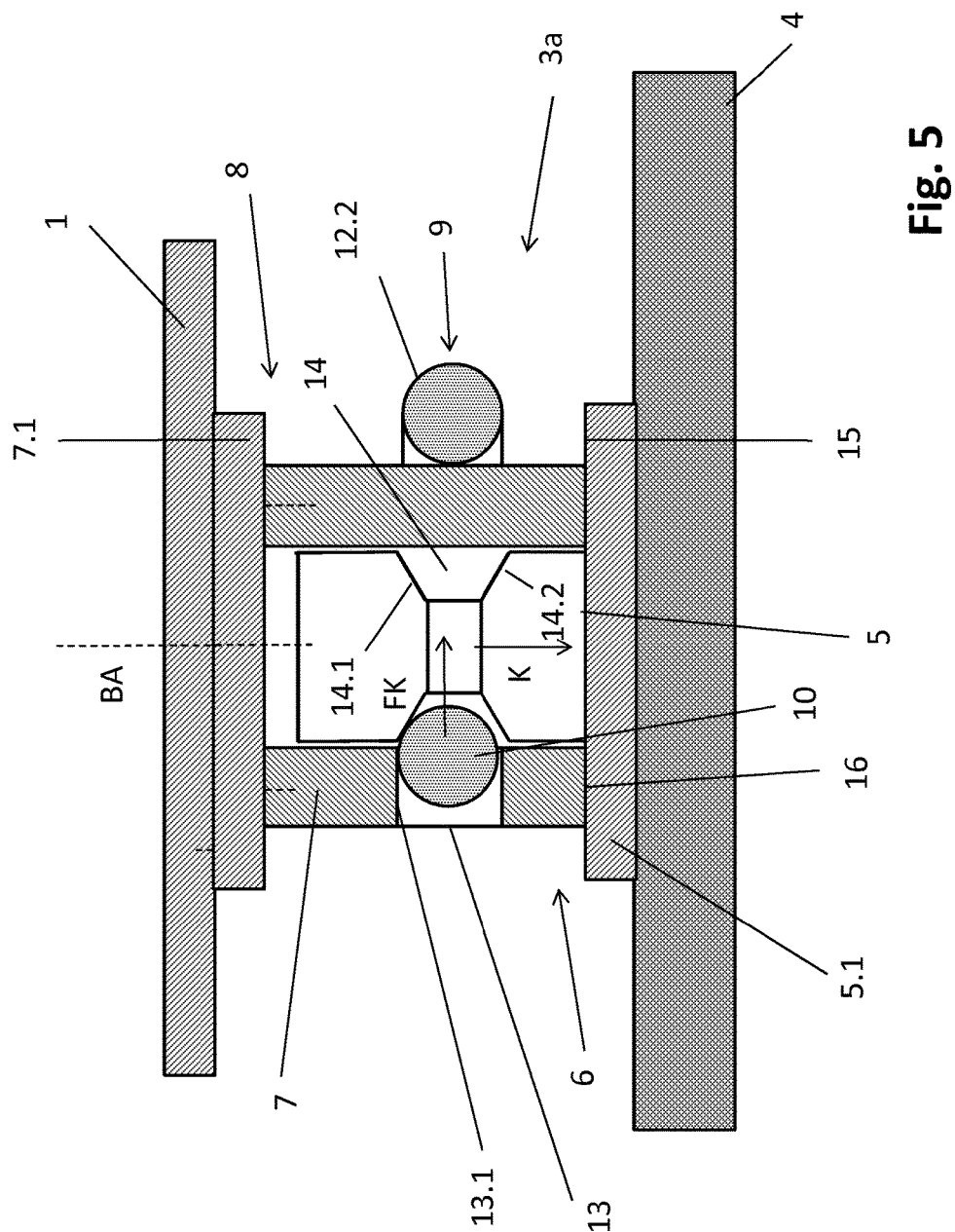
FIG. 5 shows an alternative embodiment of a fastener.

FIG. 5 shows as a further embodiment a quick-action format part fastener 3a in which first connecting element 6 is formed by the mounting stud 5, and the second connecting element 8 is formed by the locating sleeve 7. In this embodiment, the first connecting plate 5.1 is provided on the machine frame 4 and the second connecting plate 7.1 is provided on the format part 1.

When the first and second connecting elements 6, 8 are locked together, with the spring cotter's shank section 10 partly accommodated in slot 13 and projecting into the locating sleeve 7, the spring cotter's shank 10 lies against the upper side face 14.1, which in this embodiment is closest to the free end of the locating stud. The shank 10 also lies against the side face 13.1 of the slot 13, which in this case is the side face that is closer to the free end of locating sleeve 7. As a result, the spring cotter's spring force FK resolves into a component K along the axis BA that presses the contact faces of the first and second connecting elements 6, 8 against one another, thus ensuring precise positioning of the format part 1 relative to the machine frame 4.

In the embodiments described thus far, an annular face of the first connecting plate 5.1 that surrounds the mounting stud 5 forms a first contact face 15, and an annular transverse section of the locating sleeve 7 that faces away from the second connecting plate 7.1 forms a second contact face 16. However, the free planar end of the mounting stud 5 and the base of the opening of the locating sleeve 7 are also suitable as first and second contact faces 15, 16.

In addition to simplifying the fastening of the format part 1 on the machine frame 4, a further advantage of configuring the first and second connecting elements 6, 8 each with a first and second connecting plate 5.1, 7.1 is that the first and second contact faces 15, 16 are formed directly on the first and second connecting elements 6, 8 and so can be realized with a sufficient degree of accuracy while ensuring that the necessary orientation and position of the format part 1 on the machine frame 4 is both reliable and repeatable.

The invention has been described hereinbefore by reference to embodiments. It goes without saying that numerous variations as well as modifications are possible without departing from the inventive concept underlying the invention, as defined by the attached claims.

Having described the invention, and a preferred embodiment thereof, what is claimed as new, and secured by Letters Patent is:

1. A manufacture comprising a format-part fastener to be used for attaching an interchangeable format part to a machine frame, wherein said format-part fastener comprises a first connecting element, a second connecting element, and a spring cotter, wherein said first connecting element comprises a mounting stud, wherein said mounting stud extends along a stud axis, wherein said mounting stud has an angled face that makes an acute angle relative to said stud axis, wherein said second connecting element comprises a locating sleeve for receiving said mounting stud, wherein said locating sleeve comprises walls forming a slot, wherein said machine frame is a frame of one of a container treatment machine and a container transport device, wherein said spring cotter comprises an undulating section and a shank section, wherein, when said fastener is being used for attaching a format part, said undulating section surrounds part of a circumference of said locating sleeve, and said slot supports said shank section against an angled face on said mounting stud.

2. The manufacture of claim 1, wherein said angled face presents a profile such that a spring force exerted by said shank section radially inward toward said centerline causes said stud to exert an axially directed force that causes contact faces of said first and second connecting elements to lie against one another.

3. The manufacture of claim 1, wherein said angled face defines an angle that opens towards a free end of said mounting stud.

4. The manufacture of claim 1, wherein said angled face is a part of a wall that forms a circumferential groove in said stud.

5. The manufacture of claim 1, wherein said first connecting element comprises an annular face that surrounds said mounting stud, wherein said locating sleeve comprises an annular face, wherein said annular face of said first connecting element forms a first contact face, and wherein said annular face of said locating sleeve forms a second contact face.

6. The manufacture of claim 1, wherein at least one of said first and second connecting elements comprises a connecting plate that is attached to said format part.

7. The manufacture of claim 1, wherein at least one of said first and second connecting elements comprises a connecting plate that is attached to said machine frame.

8. The manufacture of claim 1, wherein said first connecting element is provided on said format part and wherein said second connecting element is provided on said machine frame.

9. The manufacture of claim 1, wherein said second connecting element is provided on said format part and wherein said first connecting element is provided on said machine frame.

10. The manufacture of claim 1, further comprising said interchangeable format part.

11. The manufacture of claim 10, wherein said angled face presents a profile such that a spring force exerted by said shank section radially inward toward said centerline causes said stud to exert an axially directed force that causes contact faces of said first and second connecting elements to lie against one another.

12. The manufacture of claim 10, wherein said angled face defines an angle that opens towards a free end of said mounting stud.

13. The manufacture of claim 10, wherein said angled face is a part of a wall that forms a circumferential groove in said stud.

14. The manufacture of claim 10, wherein said first connecting element comprises an annular face that surrounds said mounting stud, wherein said locating sleeve comprises an annular face, wherein said annular face of said first connecting element forms a first contact face, and wherein said annular face of said locating sleeve forms a second contact face.

15. The manufacture of claim 10, wherein at least one of said first and second connecting elements comprises a connecting plate that is attached to said format part.

16. The manufacture of claim 10, wherein at least one of said first and second connecting elements comprises a connecting plate that is attached to said machine frame.

17. The manufacture of claim 10, wherein said first connecting element is provided on said format part and wherein said second connecting element is provided on said machine frame.

18. The manufacture of claim 10, wherein said second connecting element is provided on said format part and wherein said first connecting element is provided on said machine frame.

* * * * *